United States Patent
Fenton

[15] 3,697,600
[45] Oct. 10, 1972

[54] PREPARATION OF A KETONE AND AN ALDEHYDE, BY CARBONYLATION OF AN OLEFIN IN THE PRESENCE OF A SECONDARY ALCOHOL

[72] Inventor: Donald M. Fenton, Anaheim, Calif.

[73] Assignee: Union Oil Company of California, Los Angeles, Calif.

[22] Filed: Oct. 10, 1969

[21] Appl. No.: 865,490

[52] U.S. Cl. ...........................260/593 R, 260/601 R
[51] Int. Cl. ................................................C07c 45/00
[58] Field of Search .........260/593 R, 601 R, 604 HF

[56] References Cited

UNITED STATES PATENTS

| | | | |
|---|---|---|---|
| 3,168,553 | 2/1965 | Slaugh | 260/593 R |
| 3,555,098 | 1/1971 | Olivier et al. | 260/604 HF |
| 3,534,103 | 10/1970 | Kehoe | 260/604 HF |

*Primary Examiner*—Daniel D. Horwitz
*Attorney*—Milton W. Lee, Richard C. Hartman, Lannas S. Henderson, Dean Sandford and Robert E. Strauss

[57] ABSTRACT

The invention comprises a preparation of a ketone and an aldehyde by contacting a hydrocarbon olefin, carbon monoxide and a secondary alcohol with a liquid reaction medium and in the presence of a Group VIII noble metal, preferably under basic conditions. A typical reaction comprises contacting ethylene, carbon monoxide and isopropyl alcohol with a reaction medium comprising rhodium trichloride to produce acetone and propionaldehyde.

10 Claims, No Drawings

PREPARATION OF A KETONE AND AN ALDEHYDE, BY CARBONYLATION OF AN OLEFIN IN THE PRESENCE OF A SECONDARY ALCOHOL

DESCRIPTION OF THE INVENTION

The invention relates to a method of forming ketones and aldehydes. More particularly, the invention relates to a method of forming ketones and aldehydes by carbonylating an olefin in the presence of a secondary alcohol.

It is known that carbonylated products may be formed by contacting an olefin with carbon monoxide and an alcohol. The products of the carbonylation wherein an alcohol is reacted is normally an ester of a saturated carboxylic acid. In some instances, as is described in U. S. Pat. No. 3,168,553 to Slaugh, an aldehyde intermediate is formed which reacts with a second olefin to produce a higher ketone. A typical reaction disclosed in the patent is contacting ethylene and carbon monoxide with ethanol to produce ethyl propionate, diethyl ketone and acetaldehyde. The patentees teach that the ethyl propionate is derived by the reaction of ethylene with carbon monoxide and ethanol; the acetaldehyde by the dehydrogentation of ethanol; and diethyl ketone by the reaction of ethylene with an aldehyde intermediate. The product ketone thus necessarily includes the hydrocarbon radicals of the olefin and the olefin and the product aldehyde includes the hydrocarbon group of the alcohol. As will be seen from the following discussion, the products of my invention differ substantially from that of the prior art in that the ketone is derived solely from the alcohol and the aldehyde from the olefin, carbon monoxide and hydrogen.

According to the invention, an olefin, carbon monoxide and a secondary alcohol are contacted with a liquid reaction medium containing a Group VIII noble metal at a temperature between 50° and 400° C. and a pressure between 1 and 200 atmospheres. The reaction proceeds according to the following equation:

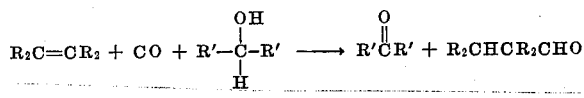

As can be seen from the above mechanism, the secondary alcohol is oxidized to the ketone releasing two hydrogens which combine with the olefin and carbon monoxide to produce an aldehyde. In this fashion the hydrocarbon groups of the ketone are derived solely from the alcohol and the hydrocarbon groups of the aldehyde are derived solely from the olefin.

The reactant alcohol of the invention comprises a secondary aliphatic mono-hydroxyl alcohol having three to 24 carbons, preferably three to 14 carbons and having the following general structure:

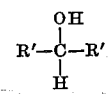

wherein R' is the same or different alkyl.

Examples of suitable alcohols are propanol-2, butanol-2, butanol-3, pentanol-2, pentanol-3, hexanol-3, heptanol-4, octanol-2, undecanol-5, hexadecanol-2, 5-butyldodecanol-3, tricosanol-6, 3-pentyldecanol-2, 4-isobutyl-5-ethylundecanol-2, etc.

The reactant olefin has two to 20 carbons, preferably 2 to 12 carbons and has the following general structure:

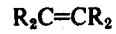

wherein R is hydrogen or the same or different alkyl.

Examples of suitable hydrocarbon olefins are ethylene, propylene, butene, pentene, hexene, heptene, nonene-2, tetradecene, eicosene-3, 3-pentyl-4-ethyl-decene-1, 2-isobutyl-5-hexylnonene-1, etc. Alpha olefins are preferred and are exemplified by ethylene, propylene, butene-1, pentene-1, hexene-1, decene-1, etc.

The catalyst of the invention comprises a Group VIII noble metal, which is preferably in complex association with a biphyllic ligand. The Group VIII noble metal may be ruthenium, rhodium, palladium, osmium, iridium, or platinum, preferably rhodium or palladium and most preferably, rhodium because of its greater activity. A catalytic quantity of the metal is added (e.g., 0.002–2 percent of the reaction medium) and the metal may be added as a soluble salt (halide, $C_1$–$C_{20}$ carboxylate, nitrate, sulfate, etc.), acid, a carbonyl, a hydride or as a chelate.

Examples of suitable sources of the noble metals are as follows: iridium carbonyl chloride, iridium carbonyl, iridium tetrabromide, iridium tribromide, iridium trifluoride, iridium trichloride, osmium trichloride, chloroosmic acid, palladium hydride, palladous chloride, palladous iodide, osmium isopropionate, iridium valerate, palladium acetate, palladous nitrate, platinic acid, platinous iodide, palladium cyanide, sodium hexachloroplatinate, potassium trichloro(ethylene)platinate(II), chloropentaamminorhodium(III) chloride, rhodium dicarbonyl chloride dimer, rhodium nitrate, rhodium trichloride, rhodium carbonyl hydride, ruthenium trichloride, tetraamminoruthenium-hydroxychloro chloride; etc. Generally the halide salt and particularly the chloride salt are preferred sources of the Group VIII noble metal (e.g., palladium chloride, rhodium chloride, etc.). It is preferable that the metal be present in a higher valency state, e.g., plus 1 to 3 rather than a reduced valency state such as zero. Thus, the reduction of the metal prior to utilization in the process by, for example, treatment with hydrogen is generally unnecessary and is not desirable.

The biphyllic ligand is a compound having at least one atom with a pair of electrons capable of forming a coordinate covalent bond with a metal atom and simultaneously having the ability to accept the electron from the metal, thereby imparting additional stability to the resulting complex. Biphyllic ligands are well known in the art and can comprise organic compounds having at least about 3 carbons and containing arsenic, antimony, phosphorus or bismuth in a trivalent state. Of these the phosphorus compounds, i.e., the phosphines, are preferred; however, the arsines, stibines and bismuthines can also be employed. In general the preferred biphyllic ligands have the following structure:

$$E(R)_3$$

wherein E is trivalent phosphorus, arsenic antimony or bismuth; and wherein R is the same or different alkyl having one to about 10 carbons, cycloalkyl having four to about 10 carbons and/or aryl having six to about 10 carbons, examples of which are methyl, butyl, nonyl, cyclohexyl, cyclodecyl, phenyl, tolyl, xylyl, duryl, etc. Preferably at least one R is aryl, e.g., phenyl, tolyl, xylyl, etc., and, most preferably, the ligand is triaryl.

Examples of suitable biphyllic ligands having the aforementioned structure and useful in my invention to stabilize the catalyst composition are the following: trimethylphosphine, triethylarsine, triethylbismuthine, triisopropylstibine, dioctylcycloheptylphosphine, tricyclohexylphosphine, ethyldiisopropylstibine, tricyclohexylphosphine, methyldiphenylphosphine, methyldiphenylstibine, triphenylphosphine, triphenylbismuthine, tri(o-tolyl)-phosphine, ethyldiphenylphosphine, phenylditolylphosphine, phenyldiisopropylphosphine, phenyldiamylphosphine, xylyldiphenylarsine, tolyldi(m-xylyl)stibine, trixylylphosphine, trixylylarsine, trixylylstibine, cyclopentyldixylylstibine, dioctylphenylphosphine, tridurylphosphine, tricumenylphosphine, trixylylbismuthine, etc. Of the afrementioned, the aryl phosphines and particularly the triarylphosphines (e.g., triphenylphosphine) are preferred because of their greater activity.

The Group VIII noble metal may be complexed with the above-described biphyllic ligand before being introduced into the reaction medium or the complex may be formed "in situ" by simply adding a compound of the metal and the biphyllic ligand directly into the reaction medium. In either case, it is generally preferable that the quantity of biphyllic ligand be in excess (e.g., 10-300 percent of that stoichiometrically required to form a complex with the Group VIII metal). The complex has from one to about 5 moles of biphyllic ligand per atom of the metal and other components such as hydride, or soluble anions such as sulfate, nitrate, $C_1-C_5$ carboxylates (e.g., acetate, propionate, isobutyrate, valerate, etc.), halide (e.g., chloride, bromide, iodide, fluoride), etc. are preferably included in the complex catalyst of this invention. These components may be incorporated in the catalyst by the formation of the catalyst complex from a Group VIII noble metal salt of the indicated anions. A preferred complex is one comprising at least one halide ligand, e.g., chloride, iodide or bromide, or at least one $C_1-C_5$ carboxylate, e.g., acetate, propionate butyrate, etc., since these groups, particularly halide, have been shown to improve the activity of the catalyst.

The reaction is performed under liquid phase conditions and can be conducted in the presence of a suitable organic liquid, preferably a liquid which is a solvent for the reactants and catalyst and inert thereto under the reaction conditions. Suitable liquids include hydrocarbons, ketones, esters or ethers or a tertiary or heterocyclic amine. Suitable liquids are exemplified by hexane, heptane, octane, benzene, toluene, cyclohexane, cyclodecane, methyl, ethyl, ketone, diethyl ketone, ethyl n-butyl ketone, cyclohexanone, butyl ether, methyl tolyl ether, di-iso-amyl ether, methyl acetate, ethyl acetate, tributyl amine, triphenyl amine, pyridine, quinoline, etc.

The reaction can also be conducted in the absence of the above solvents by conducting the reaction in an excess of the reactant alcohol and/or reactant olefin if a liquid, e.g., 2-100 times that stoichiometrically required for the reaction. This can be accomplished for example in the batch process, by terminating the reaction prior to most of the alcohol and/or olefin being consumed or, for example, in the continuous process by adding sufficient alcohol and/or olefin to maintain the desired level.

The reaction may be performed at moderate conditions, e.g., temperatures of 50°-400° C., preferably 80°-250° C. and pressures of 1-200 atmospheres absolute, preferably 5-100 atmospheres, sufficient to maintain liquid phase conditions. The desired pressure may be maintained by adding an inert gas, e.g., nitrogen to the reaction mixture. In most instances, the pressure of the reactant olefin, if a gas, and/or carbon monoxide is sufficient to maintain the aforementioned pressures.

The process is preferably conducted in the presence of a base which is believed to aid in the detachment of the hydrogens from the secondary alcohol. Suitable basic materials which may be added to the reaction medium are the inorganic metal oxides and hydroxides such as the alkali or alkaline earth metal oxides or hydroxides; the tertiary alkyl, cycloalkyl and aryl amines having three to 24 carbons; the tertiary aromatic heterocyclic amines having five to 20 carbons and one to three aromatic rings; and the bi or tri (heterocyclic)tertiary saturated hydrocarbon amines having at least one nitrogen in a bridge head position and having four to 15 carbons, preferably six to 12 carbons and one to three nitrogens. The preferred bases are the tertiary hydrocarbon amines and the aromatic heterocyclic amines, most preferably the aromatic heterocyclic amines.

Examples of suitable basic materials which can be added to the reaction medium are potassium hydroxide, sodium hydroxide, lithium hydroxide, calcium hydroxide, magnesium hydroxide, strontium oxide, barium hydroxide, tributyl amine, tripropyl amine, tri-n-pentyl amine, trioctyl amine, phenyl dibutyl amine, tricyclohexyl amine, tritolyl amine, tribenzyl amine, butyldicyclohexyl amine, pyridine, quinoline, isoquinoline, acridine, 2-chloropyridine, 3-methylpyridine, ethylpyrrole, butylpyridine, 7-ethylisoquinoline, pyrimidine, 1,4-diazabicyclo(2.2.2)octane, 1,2,4-triazabicyclo(1.1.1)pentane, 1-azabicyclo(2.2.2)octane, 1-azabicyclo(3.2.2.)nonane, 1-azatricyclo(3.3.1.1.)decane, etc. The base is generally added in amounts of 1-60 weight percent, preferably 1 to about 20 weight percent of the reaction medium, and, as indicated hereinabove, the amine bases may comprise the reaction medium.

The reaction can be performed batchwise or in a continuous fashion. When operating batchwise, the catalyst, the reaction medium, the olefin, if a liquid, the alcohol and the base, if utilized, can be introduced into the reaction zone to form a liquid phase therein and the reaction zone can be pressured with carbon monoxide and heated to the desired reaction temperature. When the olefin is a gas, it can be added with the carbon monoxide or at any time prior to the heating of the reaction medium. When performing the reaction in a continuous fashion the liquid components can be charged to the reaction zone to form a liquid phase therein and the olefin, alcohol and carbon monoxide continuously introduced into the reaction zone to contact the reaction medium containing the catalyst.

The gaseous reactants can be withdrawn as a separate effluent, cooled, depressured and the non-condensibles, chiefly carbon monoxide, can be recycled to further contacting. The liquid product can be withdrawn separately from the reaction zone by withdrawing a stream of the liquid reaction medium contained therein and the desired ketone and/or aldehyde recovered by conventional separation processing such as distillation. Any unreacted olefin and/or alcohol may be recycled to the reaction medium.

EXAMPLE 1

This example illustrates the invention and demonstrates the results actually obtained:

To a one gallon stirred autoclave were added 400 milliliters isopropyl alcohol, 0.3 grams of chlorocarbonylbis(triphenylphosphine)rhodium(I), 1 gram triphenylphosphine and 400 milliliters pyridine. The autoclave was pressured with ethylene to about 27 atmospheres and then with carbon monoxide to 55 atmospheres. The stirred mixture was heated to and maintained at 200° C. for 2 hours. The liquid contents were removed and analyzed to reveal that 200 grams of acetone and 2 grams propionaldehyde were formed.

EXAMPLE 2

The following examples illustrate other modes of practice presently contemplated:

To a one gallon autoclave may be added 500 milliliters of undecanol-3, 300 milliliters octene-2, 10 grams 2-chloropyridine and 2 grams of palladium chloride. The autoclave is pressured with carbon monoxide to 80 atmospheres. The mixture is heated to and maintained at 300° C. for 8 hours. The liquid contents are removed and ethyloctyl ketone and 2-methyloctenol recovered by distillation. Unreacted alcohol is returned to the autoclave.

To the autoclave may be added 300 milliliters nonanol-4, 300 milliliters hexadecene-1, 20 grams tributylamine and 5 grams iridium chloride. The autoclave is pressured with carbon monoxide to 60 atmospheres and heated to and maintained at 250° C. for 10 hours. The liquid contents are removed and propylpentyl ketone and heptadecenal recovered.

To an autoclave may be added 400 milliliters 5-methyldodecanol-3, 1 gram iridium acetate, 5 grams triphenylphosphine, and 10 grams sodium hydroxide. The autoclave is pressured with ethylene to 20 atmospheres and with carbon monoxide to 50 atmospheres. The stirred mixture is heated and maintained at 250° C. for about 10 hours. The liquid contents are removed and ethyl-2-methylnonyl ketone and propionaldehyde removed by distillation.

To an autoclave may be added 250 milliliters hexanol-2, 200 milliliters butene-1, 10 grams rhodium chloride and 20 grams 1,4-diazabicyclo(2.2.2.)octane. The autoclave is pressured with carbon monoxide to 50 atmospheres and heated to and maintained at 275° C. for 6 hours. The liquid contents may be removed and methylbutyl ketone and pentanal recovered by distillation.

The preceding examples are intended solely to illustrate practice of the invention and are not to be construed as unduly limiting thereof.

I claim:

1. A process for the preparation of a ketone or aldehyde comprising contacting in the absence of molecular hydrogen a secondary alcohol having from three to 24 carbons and having the structure:

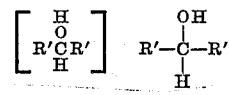

wherein R' is the same or different alkyl, with a hydrocarbon olefin having from two to about 20 carbons and having the structure:

$$R_2C=CR_2$$

wherein R is hydrogen or the same or different alkyl, with carbon monoxide in the presence of a Group VIII noble metal and a liquid reaction medium containing a base selected from the group consisting of (1) an alkali or alkaline earth metal oxide or hydroxide; (2) a trialkyl, tricycloalkyl or triaryl tertiary amine having from three to 24 carbons; (3) a tertiary aromatic heterocyclic amine having from five to 20 carbons and having from one to three aromatic rings; and (4) a bi or tri(heterocyclic) tertiary saturated amine having from four to 15 carbons and from one to three nitrogens, wherein at least one nitrogen is in a bridgehead position; said contacting being conducted at a temperature of 50°–400° C. and a pressure of 1–200 atmospheres, sufficient to maintain liquid phase.

2. The process of claim 1 wherein the olefin in an alpha olefin and said Group VIII noble metal is rhodium or palladium.

3. The process of claim 2 conducted in the presence of a biphyllic ligand having the structure:

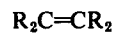

wherein E is trivalent phosphorus, arsenic, antimony or bismuth and wherein R is the same or different alkyl having one to 10 carbons, cycloalkyl having four to about 10 carbons and aryl having six to about 10 carbons.

4. The process of claim 3 wherein said base is a trialkyl, tricycloalkyl or triaryl tertiary amine having from three to 24 carbons or a tertiary aromatic heterocyclic amine having from one to three aromatic rings and from five to 20 carbons.

5. The process of claim 4 wherein said base is pyridine.

6. The process of claim 4 wherein said biphyllic ligand is a triarylphosphine.

7. The process of claim 6 wherein said olefin is ethylene, said alcohol is isopropyl alcohol, said Group VIII noble metal is rhodium and said triarylphosphine is triphenylphosphine.

8. A process for the preparation of a carbonyl compound comprising contacting in the absence of molecular hydrogen a hydrocarbon alpha mono-olefin having from two to 12 carbons and a secondary alkanol having from three to 24 carbon atoms with carbon monoxide in a liquid reaction medium containing (1) a Group VIII noble metal in complex association with a biphyllic ligand having the structure:

$$ER_3.$$

wherein E is trivalent phosphorus, arsenic antimony or bismuth; and wherein R is the same or different alkyl having one to about 10 carbons, cycloalkyl having from four to about 10 carbons and aryl having six to about 10 carbons, and (2) a base selected from the group consisting of trialkyl, tricycloalkyl and triaryl tertiary amine having from three to about 24 carbons and a tertiary aromatic heterocyclic amine having from five to about 20 carbons and having from one to about three aromatic rings; said contacting being conducted at a temperature from about 50° to 400° C. and a pressure of from 1 to about 200 atmospheres and sufficient to maintain liquid phase conditions.

9. The process of claim 8 wherein said Group VIII noble metal is rhodium or palladium.

10. The process of claim 8 wherein said base is pyridine, said Group VIII noble metal is rhodium and said biphyllic ligand is triphenyl phosphine.

* * * * *